(12) United States Patent
Padia

(10) Patent No.: US 10,729,099 B2
(45) Date of Patent: Aug. 4, 2020

(54) THREE-LAYER BOWL AND A PROCESS OF MANUFACTURING THEREOF

(71) Applicant: Ashish Padia, New Delhi (IN)

(72) Inventor: Ashish Padia, New Delhi (IN)

( * ) Notice: Subject to any disclaimer, the term of this patent is extended or adjusted under 35 U.S.C. 154(b) by 78 days.

(21) Appl. No.: 15/136,335

(22) Filed: Apr. 22, 2016

(65) Prior Publication Data
US 2017/0273276 A1    Sep. 28, 2017

(30) Foreign Application Priority Data

Mar. 28, 2016 (IN) .............................. 201611010448

(51) Int. Cl.
| | | |
|---|---|---|
| *A01K 5/01* | (2006.01) | |
| *B32B 1/02* | (2006.01) | |
| *B32B 15/04* | (2006.01) | |
| *B32B 15/18* | (2006.01) | |
| *B32B 27/08* | (2006.01) | |
| *B32B 15/08* | (2006.01) | |
| *B32B 25/08* | (2006.01) | |
| *B32B 3/30* | (2006.01) | |
| *B32B 7/10* | (2006.01) | |

(52) U.S. Cl.
CPC .............. *A01K 5/0135* (2013.01); *B32B 1/02* (2013.01); *B32B 3/30* (2013.01); *B32B 7/10* (2013.01); *B32B 15/043* (2013.01); *B32B 15/08* (2013.01); *B32B 15/18* (2013.01); *B32B 25/08* (2013.01); *B32B 27/08* (2013.01); *B32B 2250/03* (2013.01); *B32B 2250/44* (2013.01); *B32B 2274/00* (2013.01); *B32B 2307/402* (2013.01); *B32B 2307/554* (2013.01); *B32B 2307/5825* (2013.01); *B32B 2307/744* (2013.01); *B32B 2439/02* (2013.01)

(58) Field of Classification Search
CPC .... A01K 5/0114; A01K 5/0135; A01K 7/005; A01K 5/0128
USPC .............................................. 119/61.54, 61.5
See application file for complete search history.

(56) References Cited

U.S. PATENT DOCUMENTS

| | | | | |
|---|---|---|---|---|
| 3,653,362 | A * | 4/1972 | Davis ................... | A01K 5/0128 119/61.5 |
| 6,610,382 | B1 * | 8/2003 | Kobe ..................... | A63B 49/08 428/119 |
| 9,924,698 | B2 * | 3/2018 | Babal ..................... | A01K 7/005 |
| 2001/0045188 | A1 * | 11/2001 | Tsengas ............... | A01K 5/0114 119/51.01 |
| 2005/0039689 | A1 * | 2/2005 | Mossmer ............. | A01K 5/0128 119/61.5 |
| 2007/0148409 | A1 * | 6/2007 | Rios ....................... | A43B 13/22 428/167 |
| 2012/0285388 | A1 * | 11/2012 | Padia .................... | A01K 5/0114 119/61.5 |

(Continued)

*Primary Examiner* — Peter M Poon
*Assistant Examiner* — Jeffrey R Larsen
(74) *Attorney, Agent, or Firm* — Allen, Dyer, Doppelt + Gilchrist, PA

(57) ABSTRACT

The present invention is related to the pet feeder bowl. The bowl has three layers. Non-skid rubber is permanently attached to the bowl and raised till the top to give additional strength and Hermosa looks, so that the rubber cannot tear off or get damaged in different weather condition. The bowl can directly be put into the dishwasher, as all the materials, i.e. plastic, steel bowls and rubber are permanently attached to each other.

1 Claim, 2 Drawing Sheets

(56) References Cited

U.S. PATENT DOCUMENTS

| | | | | |
|---|---|---|---|---|
| 2013/0228582 A1* | 9/2013 | Bodum | ............... | A47G 19/14 |
| | | | | 220/574 |
| 2014/0076240 A1* | 3/2014 | Tsengas | ............ | A01K 5/0114 |
| | | | | 119/61.5 |
| 2014/0261202 A1* | 9/2014 | Beatty | ............... | A01K 5/0135 |
| | | | | 119/61.54 |
| 2014/0299603 A1* | 10/2014 | Joy | ..................... | A47J 36/00 |
| | | | | 220/324 |

* cited by examiner

THREE-LAYER BOWL AND A PROCESS OF MANUFACTURING THEREOF

CROSS REFERENCE TO RELATED APPLICATION

This application claims the benefit of and takes priority from Indian Patent Application No. 201611010448 filed on Mar. 28, 2016, the contents of which are herein incorporated by reference.

BACKGROUND OF THE INVENTION

Field of the Invention

The present invention relates to the field of bowls. In particularly, the present invention relates to a three-layer bowl structure. The present invention also provides a process for manufacturing said three-layer bowl.

Description of the Related Art

There are some commonly used pet bowls in the prior art. One of such types is molded plastic bowl. The molded plastic bowls have some of its advantages like cheap manufacturing; colorful appearance; non-breakable and easy to clean and maintain. But plastic bowls have one major disadvantage, which is that they are very light in weight. Due to this, they are easily moved by normal activity of pets. It can be displaced or toppled by pet accidentally or while consuming food or water. This results in a mess and wastage of food as well.

There are various known plastic pet bowls where different means have been applied to overcome the above-discussed drawbacks. One such method is to mold a plastic bowl with thicker and heavier walls so as to make the bowl bit more difficult to displace by pet during its use. Another method involved is molding the bowl with inner and/or outer walls so as to increase its weight. However, such methods do not provide completely non-displaceable pet bowls and at the same time, increase the cost of plastic bowls significantly.

Regarding some of the pet bowls known in prior-art; reference may be made to the following patents:

Reference may be made to US 2008/0216754 A1, which relates to the field of animal feeders, and particularly relates to raised dog-food bowls for taller dogs, having a food storage compartment.

This invention relates to an animal feeder, which includes a storage region having a bottom wall, and sidewalls extending upwards from the bottom wall. The animal feeder further comprises a cover with at least one depression in the cover to receive a feeding bowl. The feeding bowl is isolated from the storage region when it is seated in the depression. The main advantage of this bowl is that it's useful for taller dogs. Many digestive problems in dogs are caused by taller dogs having to bend their head down to eat or drink. A raised bowl provides an ergonomically correct eating position for taller dogs. This elevated feeding position also alleviates pain for dogs suffering from arthritis.

Further Reference may be made to PCT/SG2007/000335, which relates to a bowl for containing food or drinking water for an animal, and particularly but not exclusively, for a pet dog. There is provided a bowl for containing food for an animal, the bowl comprising an interior volume for accommodating said food, the interior volume being defined by a base and an upwardly extending circumferential sidewall, wherein at least one protruding portion extends upwardly from the base of the bowl into the interior volume to obstruct the animal from consuming food too fast. There is provided a bowl for containing drinking water for an animal, the bowl comprising: (a) an interior volume for accommodating said water, the interior volume is defined by a base and an upwardly extending circumferential sidewall; and (b) a floating device for floating on said water, wherein the floating device has a conduit for allowing said water to form a reservoir of water on a drinking surface of the floating device for the animal to consume the water. The bowl is sized to hold the quantity of food being consumed in a single feeding. The food can be dry or wet pet food.

Further Reference may be made to PCT/US2007/087189, which relates to a pet food bowl provided with an integral protrusion that helps to prevent inadvertent aspiration of food by the animal. Particularly for dogs, some feeding behaviors are characterized by swallowing large amounts of food. The protrusion in the bowl separates the food into a peripheral channel within the bowl, and the dog therefore cannot simultaneously secure large amounts of food into its mouth. The protrusion is centrally oriented and extends from the base of the bowl, thereby causing the food to be uniformly distributed within the channel. The channel or recess is preferably sized such that the animal's mouth can fit within the channel or recess, but since the food is distributed in the channel, the animal is prevented from simultaneously gathering a large amount of food in the mouth. The central protrusion has a curved or rounded configuration such that food is directed by gravity into the peripheral channel or recess. The central protrusion also serves as an obstacle to prevent the animal's mouth from accessing the entire channel of the bowl without movement of the animal.

Reference may also be made to U.S. Pat. No. 5,975,016 A, which provides a bowl for feeding a dog that avoids spillage of the food contents and as the dog licks the inside of the bowl in pursuit of the last morsels of the meal. The bowl is having a lip that is contoured a short distance toward the interior of the bowl so that food that is pushed by the animal's tongue to the lip and is trapped between the tongue and lip enabling the dog to eat all of its food with least inconvenience. There is also provided an apron extending from the lip of the ground so that an edge of the apron digs into the ground and prevents skidding of the bowl on the ground. The bowl with these features is economically manufactured with a simple mold.

Further reference may be made to JP2007159421 (A), which is about providing a dinner bowl for pets (dogs) capable of holding forth to the mouth tip of a dog while holding it with the other hand without requiring labor even in a state supporting a dog with either one hand. The dinner bowl for pets (dogs) is composed of a dinner bowl body curved in recessed state and a nearly reversed L-shaped grip provided in the dinner bowl body, and the dinner bowl is hung through the grip from the hand and outer surface of the dinner bowl body is supported by the palm. As a result, the dinner bowl is held forth to the mouth tip of dog while holding it with the other hand without requiring labor even in a state supporting the dog with either one hand.

Further reference may be made to DE202006007215, which provides Retaining bowl for receiving animal e.g. dog, food serving cup, has retaining claws over edge of cup, where bowl is made up of rubber-like material with high adhesion and is used or removed only in perpendicular direction. The bowl has gripping units and two firm or resilient retaining claws over an edge of an animal food-serving cup. The bowl is partially made up of a rubber-like material with high adhesion and is used or removed only in a perpendicular direction. The cup is partially enclosed by the bowl in a form-fit manner, where diameter of a base of the bowl is about 25 centimeters.

Reference may be made to U.S. Pat. No. 6,516,747, which provides a Non-skid pet bowl. The pet bowl is provided with a non-skid material attached to an outer wall and having improved frictional and drag properties. The non-skid material is molded over a portion of the bottom of the bowl. The non-skid material has components that extend downwardly along the outer wall and outwardly from the outer wall to contact a ground surface, with a gap defined along a contact surface between the downwardly extending and outwardly extending components of the material. The outwardly extending component of the non-skid material is preferably longer than the downwardly extending component for increased drag capabilities and to further inhibit movement of said pet bowl along a ground surface.

Reference may be made to U.S. Pat. No. 5,979,361, which relates to a Non-skid pet bowl. The non-skid pet bowl including a bowl having an undersurface. A layer of thermoplastic elastomer is disposed over the undersurface of the bowl, which provides the bowl with a non-skid lower surface. The non-skid pet bowl may be formed by a molding process that includes molding the bowl from a first material. Further, molding the layer of thermoplastic elastomer over the undersurface of the bowl, which provides a stronger bond between the bowl and the layer of thermoplastic elastomer.

Reference may be made to 3184/DEL/2005 A, which provides a SPILL PROOF PET BOWL. The pet feeding Utensil with centrally cut upper lid with new locking system of lid and the utensil, wherein the lid is fastened on the upper portion of outer side wall of the pet feeding utensil, surface of the outer wall of the utensil by forming a raised ridge around the upper portion of pet feeding utensil, and raised ridge around the inside corner edge of the side walls of the lid, forming an interlocking device when pressed against each other from opposite directions.

Reference may be made to 1591/DEL/2006 A, which relates to a THERMAL AND DENT RESISTANT BOWL. The thermal and dent resistant bowl is used for keeping solid, liquid and feeding, is made of two layers, the inner layer of which is made up of stainless steel whereas the outer layer is made up of plastic/polypropylene, in which the inner metal layer is fixed permanently with a plastic layer by molding the edges, making it temperature proof, dent proof.

Reference is made to U.S. Pat. No. 8,851,013, which relates to "Composite covered bowls such as pet food and water bowls". In this invention, there is provided a cover for a bowl, such as a pet food or water bowl that comprises a lower cover molded on or affixed to the lower surface of a bowl, and a plastic decorative outer sleeve secured to the outer surface of the bowl and held in place by the lower cover. The outer cover provides aesthetically pleasing exterior features. The lower cover provides skid resistance properties, being fabricated from rubber or plastic secured to the lower outer surface of the metallic bowl.

Another reference is made to U.S. Pat. No. 5,975,016, which provides a "Spill free dog bowl". In this invention, there is provided a feeding dish for a dog intended to prevent spillage of food while the dog is eating including an apron section mounted on a bowl section. The apron section presents a reentrant overhang from the lip toward the center of the bowl thereby directing food coming up the inside the bowl back into the bowl.

However, none of the above-discussed patents provide a three-layer pet bowl, having stainless steel bowl, plastic and TPE all fused together. There is a need, therefore, for a pet bowl having improved non-skid properties that is not displaced or toppled by normal pet activity, has an appearance which attracts pets, is easy to manufacture and is cost-effective as well. The present invention overcomes all of the above-discussed drawbacks in prior art by providing an improved product and a process of manufacturing thereof.

SUMMARY OF THE INVENTION

The main objective of the present invention is to provide an improved three-layer bowl for pets.

Another objective of the present invention is to provide a non-skid dent-proof bowl for pets.

Another objective of the invention is to provide a pet bowl, which is three layer, with all three layers being fused together.

Another objective of the invention is to provide a pet bowl, which is useful for providing both food and water to the animal.

Another objective of the present invention is to provide a pet bowl, which does not move by the normal activity of the pet.

Another objective of the invention is to provide a pet bowl in which the outer layer of bowl is covered with various dots to provide Hermosa looks.

Another objective of the invention is to provide a process for manufacturing said bowl.

Still other objects and advantages of the invention will become clear upon review of the following detailed description in conjunction with the appended drawing.

The present invention provides a bowl for feeding pets, which is three-layer and non-skid in nature. The bowl is made up of stainless steel, TPE and plastic all fused together permanently. The bowl may be used for feeding animal feed or water to pets. The bowl is not easily displaced or moved by the normal activity of the pet. A non-skid material is attached to the bottom of the bowl, said material is having improved frictional and drag properties.

The bowl can be placed in dishwasher for cleaning without any effect on the properties of the bowl.

There are several advantages of the invention, including, but not limited to:
1. Non-skid
2. Dent-proof
3. Dish-washer safe
4. Good quality material safe for feeding and storing food Accordingly, this invention provides an improved three-layer bowl, made up of stainless steel, TPE and plastic, and a process of manufacturing thereof; with said bowl having a layer of non-skid rubber permanently attached to the bowl and raised till the top to give additional strength such that rubber does not tear off or get damaged and all three layers are permanently attached to each other.

The present invention also provides a process for manufacturing said bowl, comprises the steps of:
  fabricating plastic bowls on an injection molding machine;
  fusing TPE/non-skid rubber to the plastic bowl with the help of injection molding machine, and inserting this bowl in the rubber mold and then injecting the rubber on the plastic mold, such that it gets permanently attached on the bowl due to heat and pressure;
  printing the bowl prepared in step (b) on the printing machine;
  producing Stainless steel bowl on the stamping machine;
  cutting uneven edges of stainless steel bowl on the stamping machine again and polishing this bowl;

permanently attaching the plastic bowl of step (c) to the stainless steel bowl of step (e) on the edge rolling machine to obtain the final three-layer product.

It is shown how the non-skid rubber is permanently attached to the bowl and raised till the top to give additional strength and Hermosa looks.

The plastic bowl is shown to have multiple dots, which gives additional strength to the plastic, while the TPE is around these dots in different color, which makes the bowl look astatically beautiful.

DETAILED DESCRIPTION OF THE SEVERAL EMBODIMENTS

Figure 1:
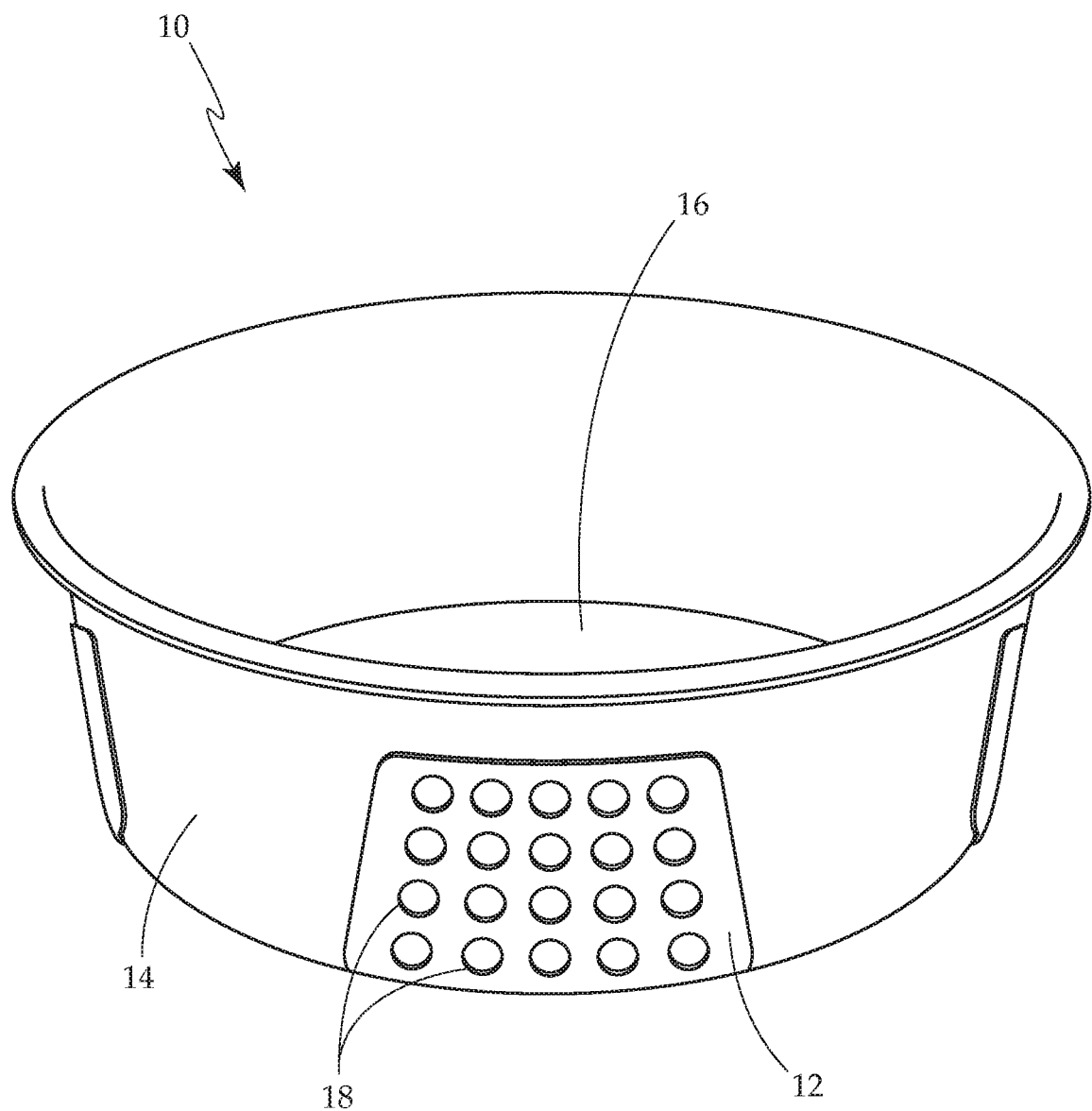
FIG. 1 illustrates a top perspective view of the improved three-layer bowl.

Turning to FIG. 1, the present invention is related to the pet feeder bowl 10. Non-skid rubber 12 is permanently attached to a bowl and raised till the top to give additional strength and Hermosa looks, so that the rubber cannot tear off or get damaged in different weather conditions. The bowl can directly be put into the dishwasher, as all the materials, i.e. plastic, steel bowls and rubber are permanently attached to each other.

The bowl has 3 layers i.e. the bowl in food contact 16 is made of stainless steel, which is considered one of the most hygienic metals for food or water contact, which the second layer is plastic 14 and the 3rd layer is TPE 12, and these 2 outer layers of plastic 14 and TPE 12 safeguards the stainless steel inside from any dents and damages.

The plastic bowl has multiple dots 18, which gives additional strength to the plastic, while the TPE 12 is around these dots in different color, which makes the bowl look astatically beautiful.

Figure 2:
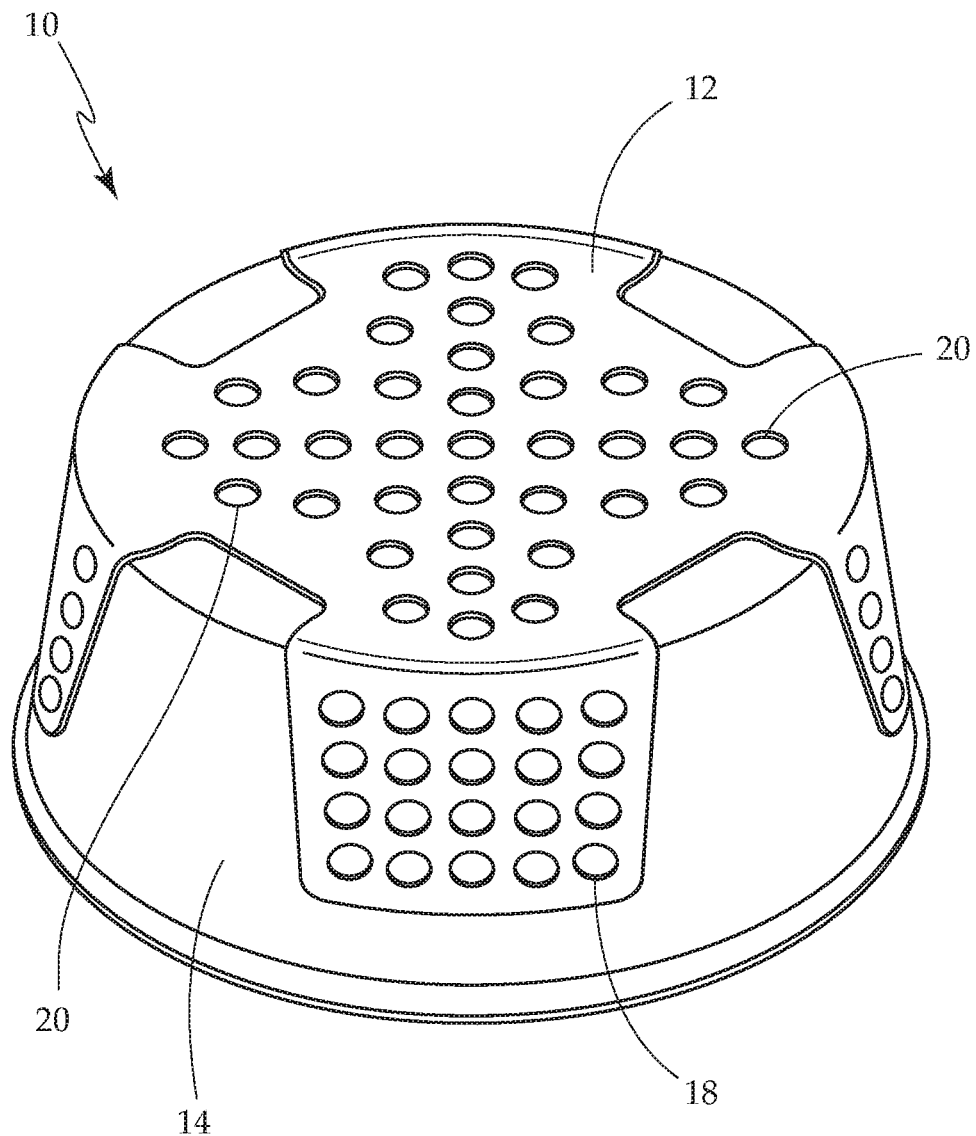
FIG. 2 illustrates a bottom perspective view of the improved three-layer bowl.

As seen in FIG. 2, the bottom base of plastic bowl 14 also has dots 20, so the bowl does not look flimsy, and TPE is filled in cross shape also looks beautiful and makes the bowl non-skid as well as stable on ground level.

The bowl of present invention comprises great anti-skid properties, as the material at the outer side of the bottom of the bowl which is used to make the bowl anti-skid in nature is Thermoplastic Elastomer (TPE) 12. The Thermoplastic Elastomer material used to make this bowl is food safe, phthalate free, lead free and cadmium free.

The resulting bowl as fabricated in this invention is dent free, as the outer portion of stainless steel bowl is protected with double layer of soft material i.e. plastic and rubber.

Since the stainless steel is an expensive material, so the outer layer of plastic and rubber is used to make the bowl heavy stable on ground and at the same time making it cost-effective.

Plastic bowl on the outer side can be printed with various print designs, so as to make the bowl look attractive.

The brief process for manufacturing of plastic bowl is as:
Fabricating plastic bowls on an injection molding machine
TPE/non-skid rubber is fused to the plastic bowl with the help of injection molding machine and,
Once the above bowl is produced, then the bowl is inserted in the rubber mold and then rubber is injected on the plastic mold, which gets permanently attached on the bowl due to heat and pressure
Plastic bowl is printed on the printing machine.
Then Stainless steel bowl is produced on the stamping machine
Uneven edges of stainless steel bowl are cut on the stamping machine again
Stainless steel bowl as produced above is polished
Now the plastic bowl is permanently attached to the stainless steel bowl on the edge rolling machine.
Final product is obtained So accordingly, this invention provides an improved three-layer bowl 10, made up of stainless steel 16, TPE 12, and plastic 14, and a process of manufacturing thereof; with said bowl having a layer of non-skid rubber permanently attached to the bowl and raised till the top to give additional strength such that rubber does not tear off or get damaged and all three layers are permanently attached to each other.

In an embodiment, said bowl comprises multiple dots 18 giving additional strength to the plastic, while the TPE is around these dots in different color, which makes the bowl look astatically beautiful and attractive for the animal.

In another embodiment, the bottom base of said bowl also has dots 20, so that the bowl does not look flimsy, and TPE is filled in cross shape also looks beautiful and makes the bowl non-skid as well as stable on ground level.

In another embodiment, non-skid rubber 12 is permanently attached to the bowl and raised till the top to give additional strength and attractive looks, so that the rubber cannot tear off or get damaged in different weather condition.

In another embodiment, said bowl can directly be put into the dishwasher, as all the materials, i.e. plastic, steel bowls and rubber are permanently attached to each other.

In another embodiment, the present invention provides a process for manufacturing said bowl, comprises the steps of:
fabricating plastic bowls on an injection molding machine;
fusing TPE/non-skid rubber to the plastic bowl with the help of injection molding machine, and inserting this bowl in the rubber mold and then injecting the rubber on the plastic mold, such that it gets permanently attached on the bowl due to heat and pressure;
printing the bowl prepared in step (b) on the printing machine;
producing Stainless steel bowl on the stamping machine;
cutting uneven edges of stainless steel bowl on the stamping machine again and polishing this bowl;
permanently attaching the plastic bowl of step (c) to the stainless steel bowl of step (e) on the edge rolling machine to obtain the final three-layer product.

In another embodiment, the improved three-layer bowl, made up of stainless steel, TPE and plastic is used as the pet feeder bowl.

What is claimed is:

1. A bowl comprising:
a first layer comprising stainless steel and having a first bottom, and first sides extending upwardly from said first bottom, said first sides and said first bottom defining a first inner surface to receive food, and a first outer surface opposite said first inner surface;
a second layer comprising a plastic material and having a second bottom, and second sides extending upwardly from said second bottom, said second sides and said second bottom defining
a second inner surface attached to and entirely surrounding said first outer surface at said first bottom and said first sides, said second layer being is flush against said first layer, and a second outer surface opposite said second inner surface and comprising a pattern of elevated bumps; and a third layer comprising a non-skid rubber material and being permanently attached to said second bottom and said second sides of said second outer surface of said second layer such that said third layer is flush against said second layer and surrounds a circumference of said pattern of elevated bumps;

said non-skid rubber material comprising a phthalate free thermoplastic elastomer (TPE);

said third layer covering said second bottom and said second sides such that no part of said third layer is in contact with said first layer;

said third layer comprising
- a square-shaped medial portion abutting and being circumscribed by said second bottom, and
- four arms extending from said square-shaped medial portion and partially up said second sides, said square-shaped medial portion and said four arms defining a cross shape,
- each of said four arms having
  - a proximal end at said square-shaped medial portion,
  - a distal end opposite said proximal end and on said second sides, and
  - canted opposing longitudinal sides extending between said proximal end and said distal end so that a respective arm has a decreasing width as the respective arm extends upward on said second sides,
- said pattern of elevated bumps covering said square-shaped medial portion and said four arms.

* * * * *